(12) United States Patent
Marhoefer

(10) Patent No.: US 8,019,445 B2
(45) Date of Patent: *Sep. 13, 2011

(54) METHOD AND APPARATUS FOR OPTIMIZATION OF DISTRIBUTED GENERATION

(75) Inventor: John Joseph Marhoefer, Chicago, IL (US)

(73) Assignee: Intelligent Generation LLC, Chicago, IL (US)

( * ) Notice: Subject to any disclaimer, the term of this patent is extended or adjusted under 35 U.S.C. 154(b) by 323 days.

This patent is subject to a terminal disclaimer.

(21) Appl. No.: 12/254,422

(22) Filed: Oct. 20, 2008

(65) Prior Publication Data

US 2009/0048716 A1 Feb. 19, 2009

Related U.S. Application Data

(63) Continuation-in-part of application No. 10/867,969, filed on Jun. 15, 2004, now Pat. No. 7,444,189.

(51) Int. Cl.
*G06F 19/00* (2011.01)
(52) U.S. Cl. .......................... 700/26; 700/291
(58) Field of Classification Search .................. 700/226, 700/273, 274, 287, 291; 307/11; 705/412, 705/410
See application file for complete search history.

(56) References Cited

U.S. PATENT DOCUMENTS

| | | | |
|---|---|---|---|
| 5,432,710 A * | 7/1995 | Ishimaru et al. | ............. 705/412 |
| 5,512,145 A | 4/1996 | Hollenberg | |
| 5,512,787 A | 4/1996 | Dederick | |
| 5,621,654 A | 4/1997 | Cohen et al. | |
| 5,880,536 A | 3/1999 | Mardirossian | |
| 5,985,474 A | 11/1999 | Chen et al. | |
| 6,029,092 A | 2/2000 | Stein | |
| 6,084,318 A | 7/2000 | Mardirossian | |
| 6,122,603 A | 9/2000 | Budike, Jr. | |
| 6,208,040 B1 | 3/2001 | Mardirossian | |
| 6,311,105 B1 | 10/2001 | Budike, Jr. | |

(Continued)

OTHER PUBLICATIONS

Marhoefer, Re-Energizing America, A Common-Sense Approach to Achieving U.S. Energy Independence in Our Generation, 2007, WingSpan Press, Livermore, California.

(Continued)

*Primary Examiner* — Kidest Bahta
(74) *Attorney, Agent, or Firm* — McDonnell Boehnen Hulbert & Berghoff LLP

(57) ABSTRACT

An energy optimization method and control apparatus may be used in a single building or a group of buildings to optimize utility-supplied and renewable sources in order to minimize the total energy cost. Simultaneously, it may also produce and store energy, such as electricity or hydrogen, that can be used to fuel vehicles, provide a means for independent production of household energy needs, or both. Various factors, such as the production of thermal energy and electricity from the renewable sources, the current store of stored energy, the current and expected thermal and electricity requirements of the building (based on a profile), the current and expected electricity loads of the equipment used to process stored energy, the expected thermal and electricity generating capacity of the renewable sources and other factors can be used to determine the mix of renewable-based and utility-based energy that minimizes the total energy cost.

19 Claims, 7 Drawing Sheets

U.S. PATENT DOCUMENTS

| | | |
|---|---|---|
| 6,369,463 B1 | 4/2002 | Maiorano |
| 7,274,975 B2 | 9/2007 | Miller |
| 2002/0082747 A1 | 6/2002 | Kramer |
| 2003/0009265 A1 | 1/2003 | Edwin |
| 2005/0165511 A1 | 7/2005 | Fairlie |
| 2005/0198963 A1* | 9/2005 | Wai et al. .......................... 60/698 |
| 2006/0208571 A1 | 9/2006 | Fairlie |
| 2007/0179672 A1* | 8/2007 | Fairlie et al. .................. 700/266 |
| 2007/0282495 A1 | 12/2007 | Kempton et al. |

OTHER PUBLICATIONS

Marhoefer, "Intelligent Generation (TM): The Smart Way to Build the Smart Grid", Natural Resources & Environment, Summer 2008, 23(1), 6 pages, American Bar Association.

Generating Hydrogen, http://fuelcellstore.com/information/generating_hydrogen.html, downloaded Apr. 16, 2003, 3 pages.

ISR and Written Opinion by the U.S. Searching Authority in application PCT/US09/61179.

* cited by examiner

METHOD AND APPARATUS FOR OPTIMIZATION OF DISTRIBUTED GENERATION

CROSS-REFERENCE TO RELATED APPLICATION

This application is a continuation-in-part of application Ser. No. 10/867,969 filed on Jun. 15, 2004, the content of which is fully incorporated herein by reference.

FIELD OF THE INVENTION

The invention relates to energy generation and storage systems. More specifically, it relates to an intelligent distributed generation system for optimizing utility-supplied electricity, natural gas, and production and storage of energy for later use to minimize a total energy cost.

BACKGROUND OF THE INVENTION

Most residences and small commercial establishments, inclusive of single-family homes, multi-family dwellings, and residential communities, require electricity and natural gas that is provided by connections to local utilities. Electricity is typically provided from a utility grid, and it can be used to power electric appliances. Natural gas is typically provided from a natural gas utility, and it can provide thermal heat for appliances, clothes dryers, hot water heaters or other uses.

The two energy sources are not interchangeable, as one must purchase appliances based on a particular energy source (e.g., an electric furnace or a gas furnace). As a result, the homeowner is subject to the seasonal price adjustments of both natural gas and electricity, typically paying more for each energy type during peak seasons (summer for electricity, winter for natural gas). In order to change the energy profile of a residence, a homeowner would then have to buy different appliances. For example, the homeowner could change the energy profile of a residence by replacing a gas furnace with an electric furnace.

Additionally, a homeowner might supplement gas or electricity requirements with alternative energy sources. For example, solar energy or wind power might be used to supplement utility-provided energy or possibly provide complete independence from utility-provided energy. Usually this substitution of alternative source energy for utility-provided energy is direct and requires an industrial-strength battery to compensate for periods when the alternative energy source is not producing energy (e.g., on a cloudy day for solar power) or when peak current events utilize more energy than the alternative source can provide (e.g., starting up an air conditioner).

The hydrogen fuel cell provides one method to interchange natural gas and electricity. Hydrogen can be produced from natural gas through a process called reformation, and it can be produced from electricity using a process called electrolysis. When processed through a fuel cell, hydrogen provides both electricity and hot water. One natural complement to the fuel cell is the use of renewable sources of energy, like photovoltaic solar panels or wind generators, to provide electricity and thermal energy that can be used directly by the building or used to supply electricity for electrolysis which then produces hydrogen for later use.

One other capability of the fuel cell is that it is a "cogeneration engine," in that its processing of hydrogen simultaneously results in the production of both electricity and thermal energy (in the form of steam or hot water). Thus, a single energy source, such as natural gas, or multiple energy sources inclusive of natural gas, renewables-based electricity, and utility-supplied electricity, can be used to produce hydrogen, which in turn can be converted into electricity and thermal energy.

Homeowners typically have one other energy requirement: transportation fuel, which is usually purchased in the form of gasoline. For many homeowners, gasoline can be the most significant component of that homeowner's monthly energy bill. Gasoline differs from electricity and thermal energy because it is typically a static, rather than dynamic, energy requirement. One acquires a specific volume of gasoline at a specific time when refueling a vehicle; electricity and natural gas needs, on the other hand, can change literally moment to moment.

U.S. Pat. No. 5,432,710 ("Ishimaru"), for example, applies the hydrogen fuel cell and its cogeneration capabilities to electricity and thermal energy requirements of the home. However, the '710 patent does not take transportation fuel into account. Similarly, U.S. Patent Pub. No. US2002/0082747 ("Kramer") addresses the thermal and electric energy requirements of a building, but it too excludes transportation fuel needs from its energy profile.

For transportation fuel needs there is lack of a refueling infrastructure for hydrogen cars and sufficient capacity in the existing electricity grid for large numbers of cars that use electricity, such as plug-in hybrids ("PHEV") or pure-electric vehicles ("PEV"). This has resulted in a "chicken-egg" enigma between automakers and energy companies. Energy companies are reluctant to invest billions of dollars in building or converting service stations to provide hydrogen fuel in the absence of a sufficient base number of hydrogen-powered (viz., fuel cell or hydrogen internal combustion) cars that require such fuel. Electric utilities are reluctant to invest in construction of additional generating plants to provide for the electricity demands of large numbers of PHEVs and PEVs until the fleet of such vehicles becomes substantial. Automakers are reluctant to invest billions of dollars in retooling or building manufacturing facilities to produce hydrogen cars or PEVs/PHEVs in the absence of a refueling infrastructure that can accommodate them.

Therefore, there exists a need to provide an improved method and apparatus for optimizing utility-supplied and alternative energy sources in order to minimize total energy costs while at the same time accounting for transportation fuel needs.

SUMMARY OF THE INVENTION

The advent of hydrogen power provides a means to make electricity, natural gas and alternative energy sources interchangeable, as hydrogen provides the means to store electricity, convert natural gas into electricity, and provide thermal energy in the form of hot water or steam. Four primary components are currently used to do this: a natural gas reformer, which converts natural gas into hydrogen (with resulting $CO_2$ emissions); an electrolyzer, which uses electric current to split water into hydrogen and oxygen (with no resultant greenhouse emissions if renewable sources of electricity, such as solar panels or wind turbines, provide the electric current); a hydrogen storage tank that contains the resulting hydrogen; and a fuel cell, which combines hydrogen and oxygen to produce electricity and steam or hot water. The feedstocks for the reformer are natural gas from the "pipe" and electricity from either the grid or renewable sources; the feedstocks for the electrolyzer are water and electricity from either the grid or renewable sources. At this time, more efficient means of producing hydrogen such as direct solar-to-hydrogen technology are in the research and development stage. At some future time, these are likely to be incorporated into the hydrogen production paradigm.

Although some individuals, particularly those living in remote areas, have achieved independence from the electric grid and natural gas pipeline (through the use of alternative energy sources and possibly portable gases like propane), one need not "throw away" connection to the existing infrastructure to derive benefit from alternative energy sources and the ability to store electricity, either in batteries or in the form of hydrogen. The grid has its uses: dispatchable power for peak current events; backup power for periods when alternative energy sources are not producing electricity; and excess baseload capacity during off-peak hours that can be stored in batteries or as hydrogen and used by an individual or community to provide electricity and/or thermal energy during peak periods.

Likewise, connection to the natural gas pipeline has its advantages: on-demand thermal energy to augment that captured in the form of steam from fuel cells or heat from solar panels; backup thermal energy for periods when alternative sources are not providing thermal energy; and relatively low rates in the summer, making it economical to convert natural gas to hydrogen to provide both electricity to reduce requirements from the grid and fuel for a hydrogen car in the peak driving season.

In the traditional arrangement, the independence of electricity, natural gas and gasoline combined with the daily and seasonal variations in peak supply and demand make energy consumption inefficient. The variability of many factors related to supply of, demand for and price of the energy sources can often result (as we experience routinely) in wild spikes in price. The interchangeability of these sources, using hydrogen as the "lowest common denominator," ameliorates this variability. In a less robust but still useful arrangement, electricity can be a common energy source for household appliances and vehicles like PHEVs/PEVs.

Sources of energy can operate with much more economical matching of daily and seasonal supply and demand. The cheapest method of producing electricity or thermal energy at any given moment, whether it is from a renewable source, the grid, the gas pipeline, batteries or stored hydrogen, can be assessed real-time and provide significant resultant savings to the consumer.

An energy supply and management system might optimally provide electricity, thermal energy, transportation fueling needs, and backup/standby energy stores for one or more buildings and hydrogen-powered or electric vehicles. The building might have a desired building environment and a total energy profile that includes both electric power and thermal energy. The system might also provide fuel for vehicles through a mechanism based upon the same source fuels that are used to provide power to the building.

In one embodiment, the energy management system receives electricity and natural gas from "traditional" sources such as electric and natural gas utilities. It can also produce electricity and thermal energy onsite from renewable sources, and can use the energy inputs from either traditional or renewable sources, or both, to produce hydrogen. The hydrogen can be used during peak consumption periods to produce electricity and natural gas as well as provide a volume of transportation fuel for a vehicle powered by a hydrogen fuel cell.

The production of hydrogen can be a type of energy arbitrage method because it can be produced at times when the relative cost of source energy is low, and consumed as a replacement for traditional sources of energy when their relative cost is high. This method of "energy arbitrage" might use an optimization method to optimize the relative mix of hydrogen created and source energy consumed.

In one embodiment, the optimization method seeks to simultaneously minimize two objective functions: $Y=a1X1+a2X2+a3X3$ and $Z=b1Y1+b2Y2+b3Y3+Y$. Y may represent the goal of creating a determined nonzero volume of hydrogen according to criteria selected by the system operator. X1 may represent the hydrogen output capacity of a natural gas reformer, subject to various constraints. X2 may represent the electrolysis capability or electricity-producing capability that renewable energy sources can provide to the production of hydrogen. It can also include direct hydrogen production by renewable sources. X3 may represent the electrolysis capability that the electric grid can provide to the production of hydrogen. The constants a1, a2 and a3 all refer to the per unit cost of producing (or purchasing) electricity or its hydrogen equivalent from supplies of natural gas, renewable sources, and the electric grid, respectively.

Z may then represent the goal of minimizing the total cost of electric and thermal energy to a building within the context of producing and maintaining a user-selected volume of hydrogen that does or does not take into account transportation fuel needs. Y1 may represent the requirement of thermal energy from natural gas. Y2 may represent the available supply of both electricity and thermal energy from renewable sources. Y3 may represent the requirement of electricity from the grid. The constants b1, b2 and b3 are the per unit costs of obtaining natural gas from the pipeline, electricity and thermal energy from renewable sources, and electricity from the grid.

In a less robust embodiment, in which natural gas is not part of the optimization method, the optimization method seeks to simultaneously minimize two objective functions: $Y=a2X2+a3X3$ and $Z=b2Y2+b3Y3+Y$. Y is the goal of creating a defined non-zero supply of electricity, with a maximum supply either determined by the user or subject to the constraints of storage, according to criteria selected by the system operator. X2 is the direct renewables to stored energy capability that the renewable energy sources can provide to the production of stored energy, subject to various constraints. X3 is the capability that a utility-provided power grid can provide to the production of stored energy. The constants a2 and a3 both refer to the per unit cost of producing or purchasing electricity from supplies of renewable sources and the electric grid, respectively.

Z may then represent the goal of minimizing the total cost of electricity to a building within the context of producing and maintaining a user-selected supply of electricity that does or does not take into account transportation fuel needs. Y2 may represent the available supply of electricity from renewable sources. Y3 may represent the requirement of electricity from the grid. The constants b1 and b2 are the per unit costs of obtaining electricity from renewable sources and electricity from the grid, respectively. This less robust example embodiment is consistent with the first example embodiment except that the X1 and Y1 factors for natural gas are not considered.

These as well as other aspects and advantages of the present invention will become apparent from reading the following detailed description, with appropriate reference to the accompanying drawings.

BRIEF DESCRIPTION OF THE DRAWINGS

Preferred embodiments of the present invention are described herein with reference to the drawings, in which.

DETAILED DESCRIPTION OF PREFERRED EMBODIMENTS

Figure 1:
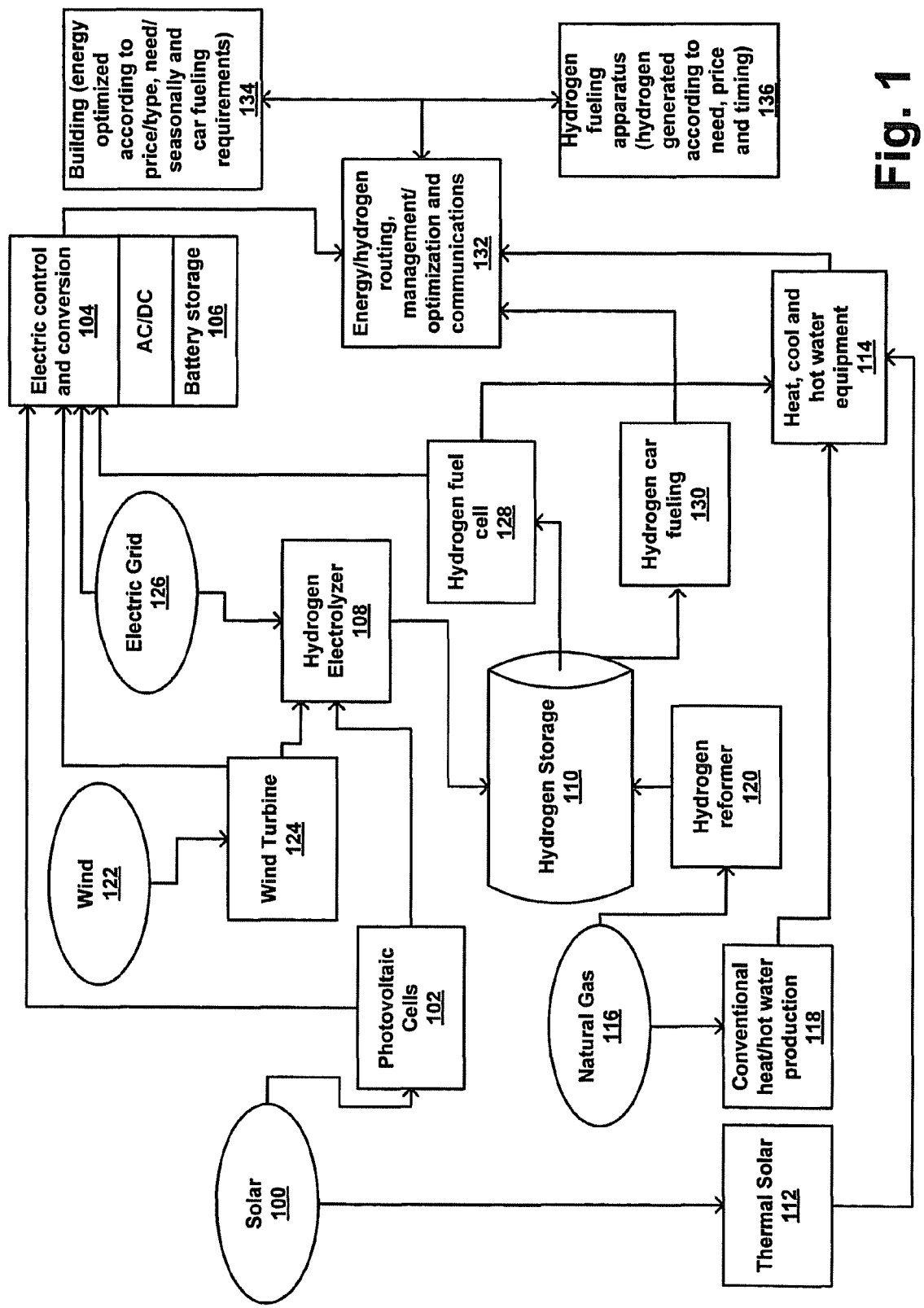
FIG. 1 is a high-level overview of a preferred energy consuming installation that depicts selected components for use in energy optimization.

An energy optimization system may be used in a building or a group of buildings to minimize total energy costs by optimizing the use of utility-supplied energy and alternative source energy. At the same time, the system may produce and store energy that can be used to fuel vehicles, to independently produce electricity and/or thermal energy, or both.

In a robust embodiment, the system might be implemented in a programmable, microprocessor-based unit that monitors the production of hydrogen, thermal energy and electricity from renewable sources, current stores of hydrogen, current and expected thermal and electricity requirements of a building, current and expected electricity load of the equipment used to process hydrogen, expected thermal and electricity generating capacity of the renewable sources, per unit costs (both seasonal and time of day) of conventional (e.g., utility-based) energy sources, and hydrogen requirements for refueling to assess an optimal mix of renewable-based and utility-based energy to result in a minimum total cost.

In a simpler embodiment, the system might be implemented in a programmable, microprocessor-based unit that monitors the production of electricity from renewable sources, the acquisition of electricity from the grid, current stores of electricity, current and expected electricity requirements of a building, current and expected electricity load of the equipment used to process stored electricity, expected electricity generating capacity of the renewable sources, per unit costs (both seasonal and time of day) of conventional (e.g., utility-based) energy sources, and electricity requirements for refueling to assess an optimal mix of renewable-based and utility-based electricity to resulting in a minimum total cost.

The initial reduction of monthly energy costs might then be accomplished by implementing one or more of the following measures:

Replacing electricity purchased from the local electric utility with electricity produced from on-site, alternative sources (e.g., photovoltaic solar panels, wind generators).

Storing excess electricity produced from on-site, alternative sources either by storing it in batteries or by using it to electrolyze water into hydrogen for later use.

Taking advantage in the differential between on-peak and off-peak electricity rates to acquire electricity from the utility during off-peak hours, storing it in batteries, and using the stored electricity during peak hours.

Replacing electricity purchased from the local electric utility with electricity created by a hydrogen fuel cell through the process of natural gas reformation, assuming the cost of natural gas and the resultant efficiency losses in converting it to hydrogen and producing electricity from a fuel cell are still less expensive than grid electricity.

Taking advantage in the differential between on-peak and off-peak electricity rates to produce hydrogen through electrolysis or natural gas reformation during off-peak hours to create electricity through a fuel cell during on-peak hours. This produces a savings if the overall efficiency (e.g., 40%) of producing electricity from electrolysis/reformation and fuel cell generation is higher than the reciprocal of the ratio between on-peak and off-peak electricity rates (e.g., 2.5:1).

Replacing thermal energy produced from electricity or natural gas with residual thermal energy from solar panels.

Replacing thermal energy produced from electricity or natural gas with thermal energy (steam) produced when a fuel cell converts hydrogen into electricity.

Providing a net reduction in the demand for grid electricity by routing excess electricity produced by alternative sources back to the electric grid (in states that provide for net metering).

Providing a net reduction in the demand for utility-produced electricity during peak hours by routing electricity stored in batteries back to the grid during periods of peak demand.

Producing hydrogen from direct renewables to hydrogen production apparati that do not require electrolysis or reformation as an intermediate step.

Additional reductions in monthly energy cost may also result when a user of the system, such as a homeowner or building occupant, uses one or more vehicles powered by electricity, in whole or in part, or by hydrogen fuel cells. In this scenario, the method determines the least expensive way to produce electricity and/or hydrogen for the vehicle while simultaneously determining the least expensive method to provide for the thermal and electric needs of the house or building.

This can then break the previously described impasse between the creation of a refueling infrastructure and the production of more electric-powered or hydrogen vehicles. That is, the system creates a decentralized hydrogen fueling infrastructure that produces hydrogen through electrolysis, reformation of natural gas and direct renewable-to-hydrogen production at individual homes, multi-family housing, neighborhood sites or small businesses; it can also create a decentralized electricity refueling infrastructure through the simultaneous incorporation of grid electricity, renewables-produced electricity, and on-site battery storage. Hydrogen or electricity produced and stored at such sites could be used to provide the energy for fuel cell cars or plug-in hybrids (PHEV)/pure-electric vehicles (PEV) owned by residents at these locations and owners/employees of small businesses.

However, the investment in creating such a decentralized infrastructure cannot be warranted on the sole basis of providing fuel for hydrogen or electric cars. Each individual refueling station might costs thousands of dollars and would, on its own, not be useful until the owner(s) of such stations had purchased/leased a hydrogen-powered car or PHEV/PEV. This, potentially, might not occur for many years after creation of the individualized infrastructure, as automakers would likely not initiate the mass production of fuel cell vehicles, PHEVs or PEVs until a critical mass of such stations came into existence.

Therefore, one need not have a hydrogen-powered vehicle or PHEV/PEV to take advantage of the optimization features. In the absence of a hydrogen-powered vehicle, hydrogen can still be used as a means of storing excess electricity generated by renewables, storing off-peak electricity and processing it in a fuel cell to supply electricity and thermal energy during peak periods, and converting natural gas into electricity. Hydrogen can also result from direct renewables-to-hydrogen production apparati now in the research and development stage. Similarly, batteries can be used as a means of storing electricity generated by renewables and storing electricity acquired from the utility during off-peak hours for later use when the market price of electricity peaks. Storing energy in this manner can still provide various immediate benefits, which can in turn promote the creation of this infrastructure.

The immediate benefits might come in the form of reduced monthly energy costs for electricity to the owner of an on-site electricity-producing and storage system, or for electricity and natural gas to the owner of the hydrogen producing station. Therefore, this method might initially reduce the monthly energy costs of the owner of the renewable electricity generating equipment or hydrogen production station while situating him/her to further reduce total energy costs once the production of hydrogen cars or PHEVs/PEVs increases. In the absence of hydrogen-powered cars or PHEVs/PEVs, this method still results in a "hydrogen car-ready" or PHEV/PEV-ready refueling installation.

FIG. 1 is a high-level overview of a preferred energy consuming installation that depicts selected components for use in energy optimization. The energy consuming installation preferably includes one or more energy sources, such as renewable sources of direct current, alternating current and thermal energy. These energy sources may include photovoltaic and/or thermal solar panels, renewable sources of alternating current (e.g., wind turbines), renewable sources of direct hydrogen production, natural gas energy sources, a connection to an electric grid or other energy sources. In addition, the energy consuming installation may also include one or more non-renewable energy sources.

These are merely examples, and it is not necessary that the energy consuming installation uses all these different energy sources. For example, the energy consuming installation may use some of these energy sources but might not use all of them. The energy consuming installation may also include other sources of energy in addition to those previously described or in place of one or more of those previously described.

The energy consuming installation also preferably includes one or more mechanisms for converting one or more sources of energy into either stored energy of the same type or into a different type of energy that can be used by sources of energy consumption. These mechanisms may include an electrolyzer, which applies electric current to water and as a result produces hydrogen. They may also include a natural gas reformer that combines electricity, heat and natural gas to produce hydrogen from methane. They may also include a battery, which stores electricity generated by renewable energy sources or acquired from the grid when the market price is low. These are merely examples, and the energy consuming installation may include other energy conversion mechanisms.

Additionally, the energy consuming installation may include one or more mechanisms for storing hydrogen, such as can be produced by the electrolyzer, natural gas reformer or other such mechanisms. For example, metal hydride storage tanks or carbon filament storage tanks might be used to store hydrogen. However, other storage mechanisms might alternatively be used. The energy consuming installation preferably includes mechanisms for processing stored hydrogen into electricity and thermal energy, such as a proton exchange membrane fuel cell or a solid oxide fuel cell. However, other mechanisms might also be used.

The energy consuming installation can consume energy directly from the sources of energy; it can consume electricity stored in the battery; it can consume electricity and thermal energy produced by a fuel cell using stored hydrogen; or it can consume energy from a combination of direct sources of energy and energy produced by the fuel cell. The offset of hydrogen produced and hydrogen consumed may factor in a static or dynamic volume of hydrogen to be used to provide transportation fuel to one or more vehicles, reserve or standby energy stores, or both.

As illustrated, a solar source 100 may interface with one or more photovoltaic cells 102. The photovoltaic cells 102 may produce electricity directly, and may interface with an electric control and conversion modules 104. The electric control and conversion module may measure the temporal input of direct and alternating current from the photovoltaic cells and wind turbine, respectively; compare this input to the temporal requirements of alternating and direct current for the facility; and convert or invert direct to alternating current, or vice versa, as necessary to satisfy the electricity demands of the facility and hydrogen-producing equipment. The electricity may be used immediately or may be stored in one or more battery storage modules 106 for later use. The photovoltaic cells 102 may also interface with a hydrogen electrolyzer 108 that produces hydrogen, which is then stored in a hydrogen storage module 110. The solar source 100 may also interface with a thermal solar module 112 that in turn interfaces with heating, cooling and hot water equipment 114.

A natural gas source 116 may interface with a conventional heat/hot water production module 118. That is, conventional means might be used to convert natural gas to heat or hot water, which can then be used in various different equipments. Alternatively, the natural gas source 116 might interface directly with a hydrogen reformer 120. The hydrogen reformer 120 can convert the natural gas into hydrogen. The hydrogen can then be stored in the hydrogen storage 110 for use at a later time, or the hydrogen might be used immediately as a source of energy for one or more different items.

Additionally, a wind source 122 can interface directly with one or more wind turbines 124. The wind turbine(s) 124 can convert the wind directly to electricity and interface with the electric control and conversion module 104. The electricity might be used immediately or stored in one or more of the battery storage modules 106. The wind turbine 124 may also interface with the hydrogen electrolyzer 108, which in turn produces hydrogen. The hydrogen can be used immediately or stored in the hydrogen storage 108.

The energy consuming installation may also include a connection to an electric grid 126. The electric grid 126 can provide power directly to the electric control and conversion module 104. While the electricity could be used right away, it might also be stored in one or more of the battery storage modules 106. The electric grid 126 can also provide electricity directly to the hydrogen electrolyzer 108, which can in turn convert the electricity to hydrogen that is then used right away or stored in the hydrogen storage 110.

The hydrogen storage 110 can interface directly with one or more fuel cells 128. The fuel cells 128 can interface with the electric control and conversion module 104 and can convert the hydrogen to electricity, which may be stored in one or more of the battery control modules 106 or consumed immediately. The fuel cells 128 can interface with the heating, cooling and hot water equipment 114 to provide thermal energy in the form of steam or hot water, for storage or immediate use. The hydrogen stored in the hydrogen storage 110 might be provided directly to a hydrogen car refueling module 130, such as can be used to provide hydrogen fuel to hydrogen powered vehicles.

The energy/electricity/hydrogen routing, management/optimization and communications device (the "optimizer") 132 can assess the electric and thermal requirements of the building 134, based upon real-time requirements and statistical profiles, the electricity requirements of a PHEV/PEV, and the hydrogen requirements of the hydrogen fueling apparatus 136, based upon used-defined requirements or statistical demand profiles. As described herein, the optimizer may perform other functions as well Within the energy consuming installation are one or more different sources of energy consumption, such as electric appliances that consume alternating current, thermal appliances that consume natural gas directly or that consume steam/hot water produced from a thermal source, vehicles that consume transportation fuel, or other sources of energy consumption. The energy consuming installation may also include other sources of energy consumption.

The optimizer 132 preferably includes a microprocessor-based optimization system, which optimizes the mix of energy from all available energy sources, including stored electricity and/or stored hydrogen, to satisfy the electric, thermal, and transportation fuel demands of the installation according to various optimization factors, such as the lowest possible cost. The electric and thermal demands are preferably dynamic, as is the available energy from renewable sources. The transportation fuel demand is preferably static but may be subject to user-definable or system-definable ranges of volumes.

Figure 5:
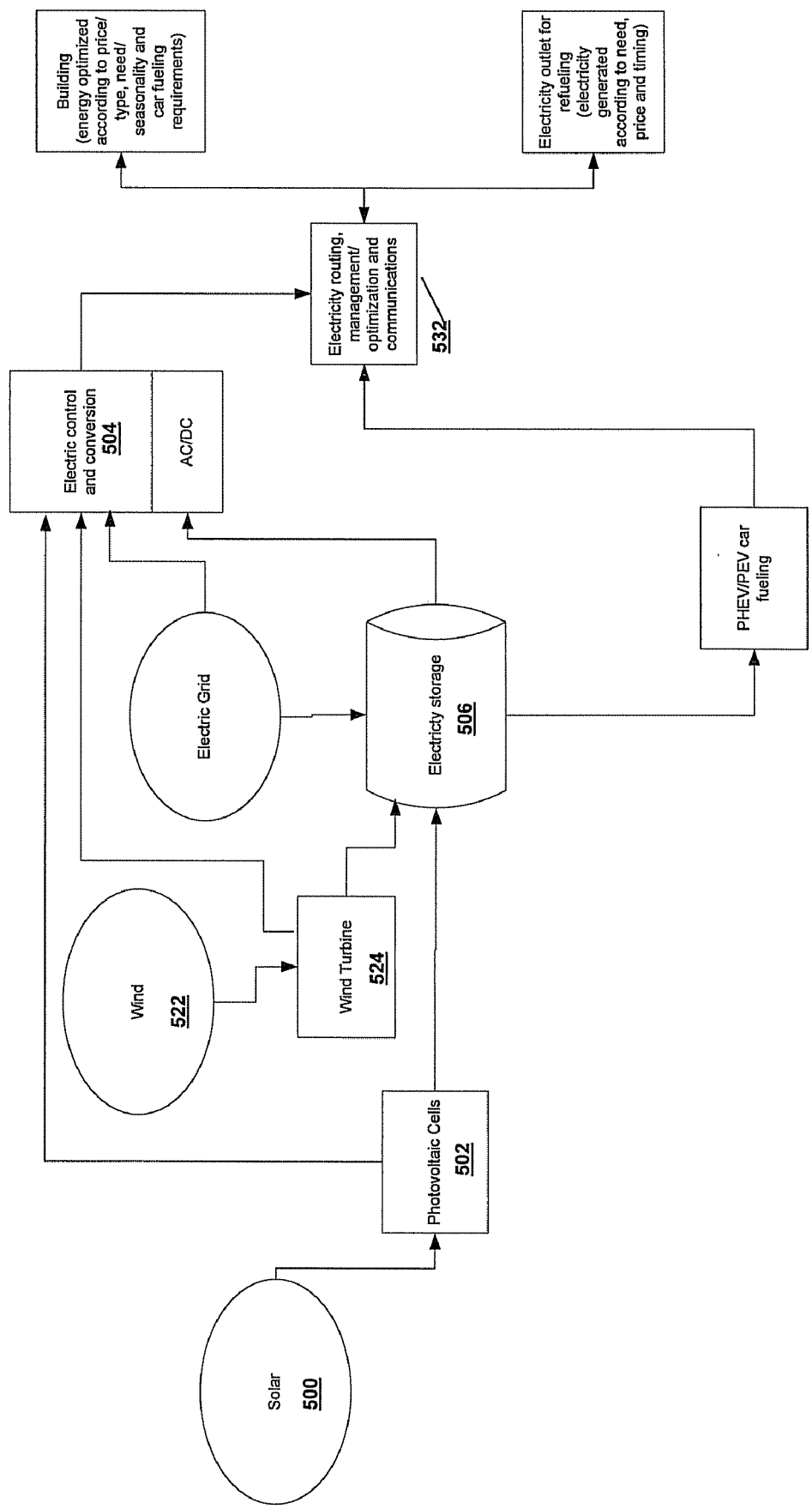
FIG. 5 is a high-level overview of an example electricity consuming installation that depicts selected components for use in electricity optimization.

Similarly, FIG. 5 is a high-level overview of an example alternate energy consuming installation that depicts selected components for use in electricity optimization, a subset of overall energy optimization. The electricity consuming installation preferably includes one or more electricity sources, such as renewable sources of direct current or alternating current. These electricity sources may include photovoltaic solar panels, renewable sources of alternating current (e.g., wind turbines), a connection to an electric grid or other energy sources. The electricity consuming installation also may include a means of storing electricity, such as a battery. It also may include a vehicle that runs in part or in whole on electricity, such as a PHEV or PEV. The electricity sources can power the installation's electric appliances directly, provide electricity to the PHEV/PEV directly, or provide stored electricity for later use. The microprocessor-based optimization system can optimize acquisition of electricity from all available electricity sources according to criteria set by the user, such as lowest possible cost.

As illustrated, the installation may include a solar source 500, which may interface with one or more photovoltaic cells 502. The photovoltaic cells 502 may produce electricity directly, and may interface with an electric control and conversion module 504. The electric control and conversion module 504 may measure the temporal input of direct and alternating current from the photovoltaic cells 502, as well as other sources, such as one or more wind turbines 524; compare this input to the temporal requirements of alternating and direct current for the facility and/or PEV/PHEV; and convert or invert direct to alternating current, or vice versa, as necessary to satisfy the electricity demands of the facility and PEV/PHEV. The electricity may be used immediately or may be stored in one or more electricity storage modules (e.g., batteries) 506 for later use. Additionally, the installation may include a wind source 522, which can interface directly with one or more wind turbines 524. The wind turbine(s) 524 can convert the wind directly to electricity and interface with the electric control and conversion module 504. The electricity might be used immediately or stored in one or more of the battery storage modules 506.

The installation may also include an optimizer 532. In one embodiment, the optimizer 532 preferably includes a microprocessor-based optimization system, which optimizes the mix of electricity from all available energy sources, including stored electricity, to satisfy the electric and transportation fuel demands of the installation according to various optimization factors, such as the lowest possible cost. The electric demands will usually be dynamic, as will be the available electricity from renewable sources. The transportation fuel demand will usually be static but may be subject to user-definable or system-definable ranges of volumes.

Figure 2:
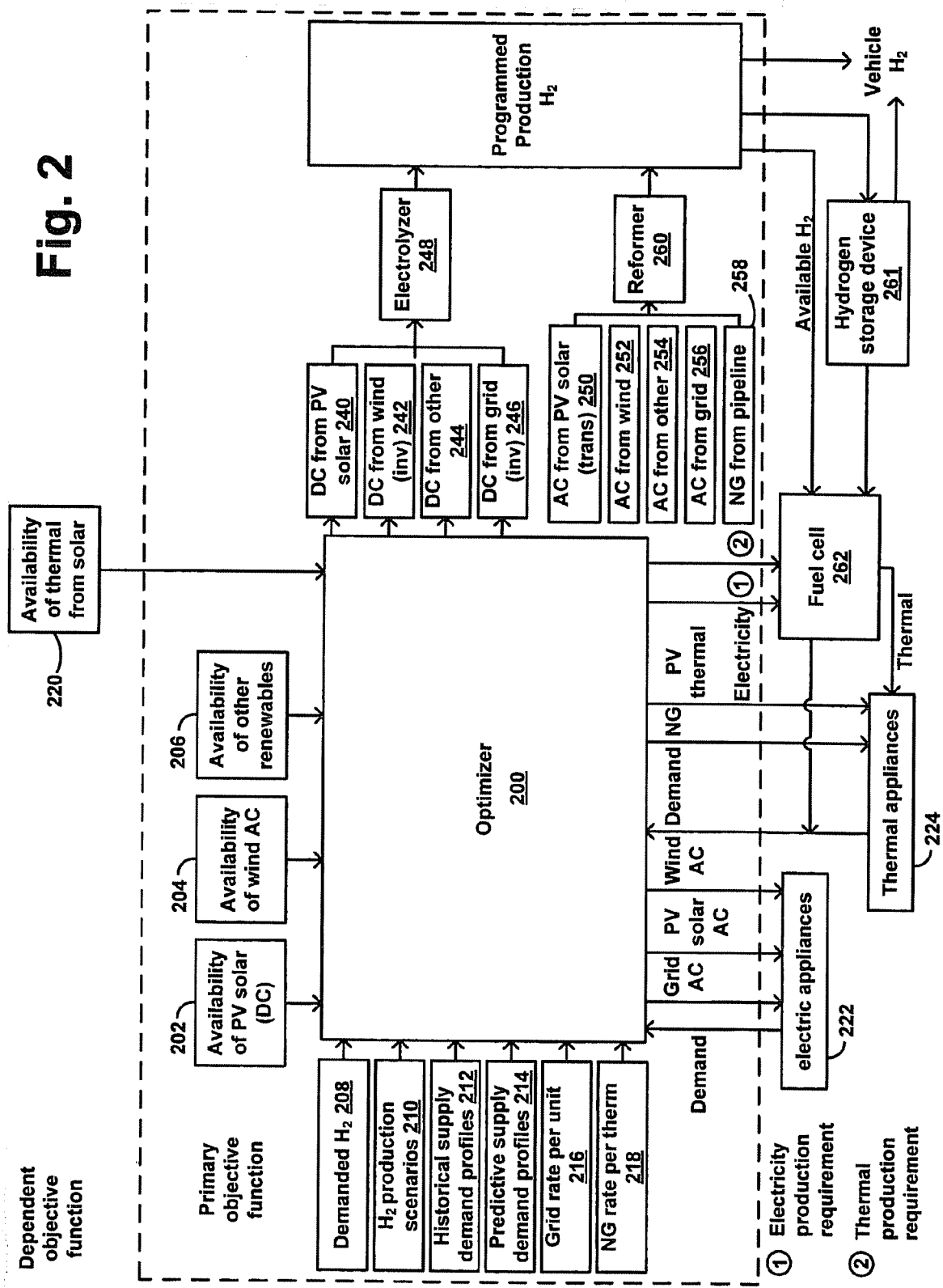
FIG. 2 is a logical level flowchart of a preferred energy optimization system.

FIG. 2 is a logical level flowchart of a preferred energy optimization system. The optimization system described herein is generally based upon the simultaneous optimization of two objective functions. The flowchart illustrates various inputs and outputs to the two objective functions. It should be understood, however, that while the principles discussed herein generally refer to two different objective functions, those functions might alternatively be combined in to a single function or might alternatively be split into more than two functions.

The first objective function is preferably an independent function, which is generally illustrated by a dashed line in the figure. The independent function governs the production of a specific volume of electricity or hydrogen or a volume of electricity or hydrogen within a range of volumes based upon one or more particular criterion, such as at the lowest possible cost or a temporal range. However, and as will be described later, the first objective function might take into account other criteria as well. The second objective function is preferably a dependent function that is dependent upon the first objective function. The second objective function generally seeks to minimize the total energy cost of providing for the electric, thermal and transportation energy needs of the energy consuming installation.

The goal of the independent objective function for a hydrogen-based system is to produce a user-defined volume of hydrogen, either threshold or dynamic, to be stored at a selected pressure, through electrolysis, reformation of natural gas, other means of renewable hydrogen extraction (such as biomass, reformation of ethanol or direct renewables-to-hydrogen technology) or a combination of these methods. The choice and mix of methods used to produce the user-defined volume of hydrogen may be based upon the current and expected cost of energy, depending upon its source; the efficiency of the method of production; the availability of the energy source or other factors.

Similarly, the goal of the independent objective function for an electricity-based system is to produce a user-defined supply of electricity, either threshold or dynamic, to be stored for later use. The choice and mix of methods used to produce the user-defined supply of electricity may be based upon the current and expected cost of energy, depending upon its source; the efficiency of the method of production; the availability of the energy source or other factors.

The objective functions might include a combination of static components including the various thresholds and costs of purchasing electricity and natural gas (for the hydrogen-based system) from the local utilities. To a great extent, the efficiency rates of various components (e.g., the overall efficiencies of batteries, electrolysis, reformation of natural gas and conversion of DC electricity from solar panels into AC) are static, although they will more typically operate according to tight ranges. These are merely examples, and the objective functions may take into account other static components as well.

Variable components can include hourly, daily, monthly and seasonal consumption, the amount of sunlight in a given interval (second/hour/day), the amount of wind in a given interval, the ambient temperature by hour, the amount of electricity and/or hydrogen needed/desired by the owner of the system or other components. Many of these variables can be forecast with reasonable accuracy, for example, based on weather predictions and historical consumption profiles. Many of these variables may also be updated on a real-time basis, such as by using information from external sources.

In one preferred embodiment, the independent objective function is stated as: $Y = a1X1 + a2X2 + a3X3$. Y is the goal of creating a defined non-zero volume of hydrogen, with a maximum volume either determined by the user or subject to the constraints of storage, according to criteria selected by the system operator. X1 is the output capability of a natural gas reformer, subject to various constraints. X2 is the electrolysis and direct renewable-to-hydrogen capability that renewable energy sources can provide to the production of hydrogen. X3 is the electrolysis capability that the electric grid can provide to the production of hydrogen.

The constants a1, a2 and a3 all refer to the per unit cost of producing (or purchasing) electricity or its hydrogen equivalent from supplies of natural gas, renewable sources and the electric grid, respectively. The constants a1 and a3 are generally subject to variation on a momentary, hourly, daily or seasonal basis based upon the rate schedules of the electric and natural gas utilities. Other factors might also affect the constants.

Numerous variables may be considered in the output capabilities of X1, X2 and X3. These variables include, but are not limited to, one or more of the variables listed in Table 1.

TABLE 1

| Variable | Description |
| --- | --- |
| X1 | conversion efficiency of the natural gas reformer |
| X2 | AC requirement of the natural gas reformer |
| X3 | maximum output capacity in kWh of the natural gas reformer |
| X4 | maximum DC output capacity of photovoltaic solar panels |
| X5 | contemporary availability of photovoltaic energy as a percentage of maximum output |
| X6 | relative efficiency of photovoltaic solar panels |
| X7 | maximum AC output capacity of wind generator |
| X8 | contemporary availability of alternating current from wind generator as a percentage of maximum output |
| X9 | relative efficiency of wind generator |
| X10 | maximum DC output capacity of sources of renewable energy other than photovoltaic solar |
| X11 | contemporary availability of direct current from sources of renewable energy other than photovoltaic solar |
| X12 | relative efficiency of renewable sources of direct current other than photovoltaic solar |
| X13 | maximum AC output capacity of sources of renewable energy other than wind generators |
| X14 | relative efficiency of renewable sources of AC other than wind generators |
| X15 | conversion efficiency of the electrolyzer |
| X16 | electricity requirement of the electrolyzer |
| X17 | maximum output capacity in kWh of the electrolyzer |
| X18 | statistical profile of the pattern and likelihood of photovoltaic energy over a fixed or dynamic period |
| X19 | statistical profile of the pattern and likelihood of wind energy over a fixed or dynamic period |
| X20 | relative inefficiency of AC/DC transformer |
| X21 | limitations on the volume of natural gas that may be used for reforming because of environmental or other constraints |
| X22 | maximum capacity of the installation for AC input from the grid |
| X23 | maximum capacity of the installation for natural gas input from the pipeline |
| X24 | electricity requirement of the compressor |

The optimization of cost for the production of hydrogen will generally depend upon the production scenario that the user selects. Some of these scenarios, specifically scenarios #1-3 that are described below, mandate production of a minimum volume of hydrogen either as rapidly as possible or within a certain timeframe. Such scenarios are more likely to occur when a specific quantity of hydrogen must be produced to provide hydrogen to a hydrogen-powered (fuel cell or hydrogen internal combustion) car within a certain timeframe.

Scenarios can be staggered or prioritized so that fulfillment of one objective results in replacement by another scenario, or expiration of the time allotted (see e.g., scenarios 2 and 3) then results in replacement by another, perhaps "default", scenario. Various scenarios are depicted in Table 2.

TABLE 2

| | |
| --- | --- |
| Scenario #1 | Fill the hydrogen tank (to at least H1% capacity) as rapidly as possible while minimizing total cost |
| Scenario #2 | Fill the hydrogen tank (to at least H2% capacity) within T hours while minimizing total cost |
| Scenario #3 | Fill the hydrogen tank (to at least H3% capacity) between the hours of t1 AM/PM and t2 AM/PM while minimizing total cost. |
| Scenario #4 | Optimize the energy management system for lowest possible cost, with any excess from alternatives going to 4a) hydrogen production or 4b) the grid. The period for this optimization can be determined by the user |
| Scenario #5 | Maintain the quantity of hydrogen between H3% and H4% capacity of the hydrogen tank at all times, using the flexibility in this option to achieve the lowest possible total energy cost |
| Scenario #6 | Disengage alternatives and run solely from the grid and natural gas pipeline (while performing maintenance/repair of alternative components) |

When time is of the essence, the independent objective function is likely to result in the production of hydrogen using the least expensive available source (typically renewable energy sources powering electrolysis), followed by the next least expensive available source (typically grid electricity during late-night hours and/or reformation of natural gas during the summer months) until full production capacity of the natural gas reformer and electrolyzer is achieved. Generally, the fixed-time or ASAP scenarios will not trigger the need to simultaneously optimize the dependent objective function unless a surplus of renewable energy (e.g., a quantity that exceeds what is required to power the maximum capacity of the electrolyzer) is produced.

Figure 6:
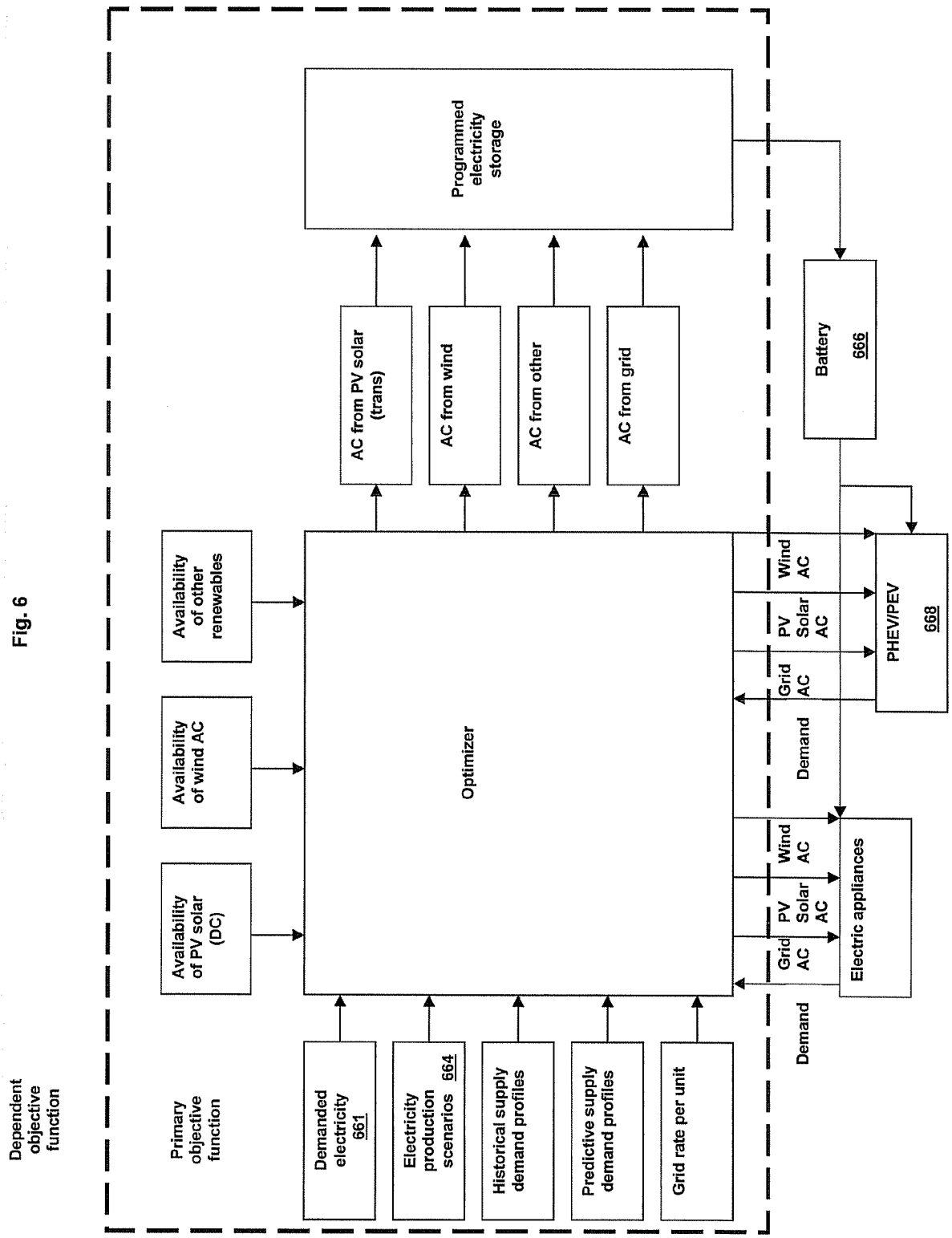
FIG. 6 is a logical level flowchart of an example electricity optimization system.

In a simpler embodiment that does not factor natural gas or thermal energy into the optimization calculus, the independent objective function is stated as: Y=a2X2+a3X3. Y is the goal of creating a defined non-zero supply of electricity, with a maximum supply either determined by the user or subject to the constraints of storage, according to criteria selected by the system operator. X2 is the direct renewables to stored energy capability that the renewable energy sources can provide to the production of stored energy, subject to various constraints. X3 is the capability that a utility-provided power grid can provide to the production of stored energy. The constants a2 and a3 both refer to the per unit cost of producing or purchasing electricity from supplies of renewable sources and the electric grid, respectively. The constants a2 and a3 are generally subject to variation on a momentary, hourly, daily or seasonal basis based upon the current and projected availability of electricity from renewable energy sources and the rate schedules of the electric utility. Other factors might also affect the constants. The simpler example embodiment is consistent with the example embodiment previously explained with the exception that the X1 optimization factor for natural gas is zero. The scenarios for an electricity-based system would be comparable to those in Table 2 and could be accomplished by substituting "batteries" for "hydrogen tank" and "electricity" for "hydrogen." FIG. 6 provides an example of a logical level flowchart for such an energy optimization system.

The dependent objective function incorporates the hydrogen or electricity production objective Y into the overall energy scheme of the building, including transportation fueling requirements, if any. Depending on the objective of Y, it provides for net increases to the stored electricity supply or hydrogen volume using excess energy from renewables or relatively inexpensive energy produced by utilities (e.g., market-priced grid electricity during late night hours) or provides for net decreases to the stored electricity or hydrogen volume during periods when peak costs of traditional energy sources are high and the relative cost of using and replacing the stored hydrogen is and is expected to be low.

The goal of the dependent objective function is to minimize the total cost of energy within the context of producing and maintaining a user defined, nonzero volume of hydrogen. To this extent, the objective function for the total installation, inclusive of electricity, thermal energy and automotive fuel is driven by the hydrogen production scenarios, whether hierarchical or sequential, selected by the user. In one preferred embodiment, the dependent objective function is stated as Z=b1Y1+b2Y2+b3Y3+Y.

Z is the goal of minimizing the total cost of electricity and thermal energy to a building within the context of creating and maintaining a supply of hydrogen. Y1 is the requirement of thermal energy from natural gas. Y2 is the available supply of both electricity and thermal energy from renewable sources. Y3 is the requirement of electricity from the grid. Y is the available quantity of hydrogen produced in the first objective function; its volume can be used to produce electricity, thermal energy, and transportation fuel.

The constants b1, b2 and b3 are the per unit costs of obtaining natural gas from the pipeline, electricity and thermal energy from renewable sources, and electricity from the grid, respectively. These realized constants will typically differ from a1, a2, and a3 because of the inherent inefficiency of hydrogen production found in the independent objective function.

Numerous variables might be considered in satisfying the consumption requirements and output capacities of Y1, Y2 and Y3. These variables include, but are not limited to, one or more of the variables listed in Table 3.

TABLE 3

| Variable | Description |
|---|---|
| y1 | the contemporary electric consumption of the installation, exclusive of the requirements of the independent objective function |
| y2 | the contemporary thermal consumption of the installation |
| y3 | the relative efficiency of the fuel cell in converting hydrogen into electricity |
| y4 | the relative efficiency of the fuel cell in converting hydrogen into thermal energy |
| y5 | the relative efficiency of converting direct current from the fuel cell into alternating current for the installation |
| y6 | the relative efficiency of inverting direct current from the photovoltaic solar panels into alternating current for the installation |
| y7 | the current unused capacity of one or more hot water heating units for the installation |
| y8 = x4 | maximum DC output capacity of photovoltaic solar panels |
| y9 = x5 | contemporary availability of photovoltaic energy as a percentage of maximum output |
| y10 = x6 | relative efficiency of photovoltaic solar panels |
| y11 = x7 | maximum AC output capacity of wind generator |
| y12 = x8 | contemporary availability of alternating current from wind generator as a percentage of maximum output |
| y13 = x9 | relative efficiency of wind generator |
| y14 = x10 | maximum DC output capacity of sources of renewable energy other than photovoltaic solar |
| y15 = x11 | contemporary availability of direct current from sources of renewable energy other than photovoltaic solar |
| y16 = x12 | relative efficiency of renewable sources of direct current other than photovoltaic solar |
| y17 = x13 | maximum AC output capacity of sources of renewable energy other than wind generators |
| y18 = x13 | contemporary availability of alternating current from sources of renewable energy other than wind generators |
| y19 = x14 | relative efficiency of renewable sources of AC other than wind generators |
| y20 | thermal output of the solar panels |
| y21 | maximum instantaneous electric output of the fuel cell |
| y22 | maximum instantaneous thermal output of the fuel cell |
| y23 | temperature of hot water contained in hot water heater |
| y24 | desired ambient temperature of one or more zones within the installation |
| y25 = x18 | statistical profile of the pattern and likelihood of photovoltaic energy over a fixed or dynamic period |
| y26 = x19 | statistical profile of the pattern and likelihood of wind energy over a fixed or dynamic period |
| y27 | the temporal profile of expected electricity requirements for the building over a fixed or dynamic period |
| y28 | the temporal profile of expected thermal requirements for the building over a fixed or dynamic period |
| y28 | the applicability of thermal production of the fuel cell to be used for building heat as opposed to solely for hot water |
| y29 | minimum flat rate electricity charge for first y30 kilowatt hours (e.g., 8.275 cents for first 400 kWh) |
| y30 | basic number of demand hours for y29 electricity charge |
| y31 | standard flat rate electricity charge for kilowatt hours in excess of y30 (e.g., 6.725 cents for kilowatt hours in excess of 400 kWh) |
| y31 | baseload electricity charge for first y31 kilowatt hours (e.g., 5.425 cents for first 350 kWh) |

TABLE 3-continued

| Variable | Description |
| --- | --- |
| y32 | value for y31 to which base load charges apply |
| y33 | peak electricity charge which applies to kilowatt hours in excess of y32 |
| y34 | daytime electricity charge which applies between y36 AM and y37 PM |
| y35 | night time electricity charge which applies between y37 PM and y36 AM |
| y36 | Am time value for time-of-day electric metering |
| y37 | PM time value for time of day metering |
| y38 | current and scheduled thermostat settings |

The optimization of cost for providing the total electric and thermal needs of the building within the context of the independent objective of producing and maintaining a specified minimum volume of hydrogen or a volume of hydrogen within a given range is greatly dependent upon the user scenario selected for Y. Greater opportunity for cost savings is possible when the independent objective allows for a range of volumes or is flexible as to timeframe.

To this end, the objective function for Z is likely to take into account historical and projected profiles of various forms of energy supply and consumption when the independent objective function for Y allows for a range of hydrogen volumes or a flexible timeframe for producing it. Thus, the simultaneous optimization scheme can take into account user defined constants, externally defined variables like electric rates per kilowatt hour and natural gas rates per therm, and variables inherent to the optimization scheme like the energy consumption requirements and the availability of alternative sources of energy.

For example, the optimization profile might take into significant account such variables as the likely market price of electricity under a time-of-use or market based rate schedule; the electric load requirements at various points during summer days based upon the expected ambient outdoor temperatures, by hour; the natural gas consumption requirements for thermal heating at various points during winter days based upon the expected ambient outdoor temperatures by hour as well as thermostat settings within the building (in one or more zones); weather predictions of the availability of sunlight and its intensity during the day, and the availability and force of wind at various points as well; overall component efficiency of the electrolyzer, natural gas reformer, and fuel cell, based upon factors like the weather; and statistical patterns and deviations from these patterns of the types of variables outlined above.

As depicted in FIG. 2, the optimizer 200 may receive multiple inputs that are part of the independent objective function, which is conceptually illustrated by the dashed line surrounding the optimizer 200. As illustrated, the optimizer 200 may receive as input the "availability of photovoltaic/solar DC sources" 202, the "availability of wind AC sources" 204 and the "availability of other renewables" 206. The optimizer 200 may additionally receive as input the "demanded H2 volume" 208, the "H2 production scenarios" 210, "historical supply/demand profiles" 212, "predictive supply/demand profiles" 214. The various inputs are then used by the optimizer 200 in optimizing the independent objective function.

The optimizer 200 may additionally receive inputs that are used in computing the dependent objective function. These inputs are generally illustrated in the figure as being outside the dashed line. As previously described, the dependent objective function may be dependent on the independent objective function, and therefore the inputs associated with the independent objective function may also be used in computing the dependent objection function. The inputs illustrated as being outside the dashed line include the "availability of thermal energy from solar" 200, the demand from electric appliances 222, and the demand from thermal appliances 224. Once the optimizer 200 receives these various inputs for the two functions, it can then compute the outputs of the independent and dependent objective functions.

As depicted, the outputs for the independent objective function may include "DC from photovoltaic/solar sources" 240, "DC from wind sources" 242, "DC from other renewable sources" 244 and "DC from electric grid" 246. These outputs 240-246 may in turn be inputted into the electrolyzer 248, although electricity phase inversion may be required when these sources arrive in AC form. The outputs for the independent objective function may also include "AC from photovoltaic/solar sources" 250, "AC from wind sources" 252, "AC from other sources" 254, "AC from electric grid" 256 and "Natural Gas from pipeline source" 258. These outputs are in turn inputted into the reformer 260, with the outputs of the reformer 260 and the electrolyzer 248 determining hydrogen production for the system. The hydrogen that is produced can be used to fill hydrogen-powered vehicles, such as at filling stations, or can be provided to a fuel cell 262.

The outputs for the dependent objective function include "AC from electric grid", "AC from photovoltaic/solar sources" (after any required phase inversion) and "AC from wind source, which are in turn inputted into the various electric appliances 222. The dependent objective function also includes outputs for natural gas and photovoltaic/solar sources that power the system's thermal appliances 224. As previously described, the hydrogen produced by the system can be used to fill hydrogen-powered vehicles or may be stored in a hydrogen storage device 261, where it can be used to fuel hydrogen-powered vehicles or power a fuel cell 262. The optimizer 200 may provide the fuel cell 262 with its requirements for both electricity production and thermal production. Electricity produced by the fuel cell 262 can be provided, for example, to the electric appliances 222. Thermal power produced by the fuel cell 262 can be provided, for example, to the thermal appliances 224.

It should be understood that the logical depiction of the independent and dependent objective functions in this figure is merely exemplary in nature. As previously described, the independent and dependent objective functions may include a variety of other inputs and outputs, and the system may include a variety of other components. In a simpler embodiment based on stored electricity, such as the example embodiment depicted in FIG. 6, the dependent objective function is stated as $Z=b2Y2+b3Y3+Y$; the dependent objective function in this simpler embodiment is consistent with that of the first embodiment except that the requirement of thermal energy from natural gas, Y1, is zero. Z is the goal of minimizing the total cost of electricity to a building within the context of creating and maintaining a supply of stored electricity. Y2 is the available supply of electricity from renewable sources. Y3 is the requirement of electricity from the grid. Y is the available quantity of electricity produced in the first objective function; its supply can be used to produce electricity and transportation fuel. The constants b2 and b3 are the per unit costs of obtaining electricity from renewable sources and electricity from the grid, respectively. These realized constants may differ from a2 and a3 because of the time-based differences in availability and cost for the acquisition of electricity given the factoring of the stored quantity, Y, into the optimization calculus.

The example electricity-only optimization method depicted in FIG. 6 corresponds to the example embodiment depicted in FIG. 2 with some minor differences. One is that FIG. 6 depicts an input of Demanded electricity 661 instead of the input of Demanded $H_2$ 208, as shown in FIG. 2. Another is that FIG. 6 depicts an input of Electricity production scenarios 664 instead of $H_2$ production scenarios 210, as shown in FIG. 2. In addition, FIG. 6 depicts the incorporation of an electricity storage device 666 (e.g., a battery) instead of the hydrogen storage device 261 depicted in FIG. 2. Finally, the electricity requirements of a PHEV/PEV 668 are incorporated as a component of the example electricity optimization method depicted in FIG. 6.

Figure 3:
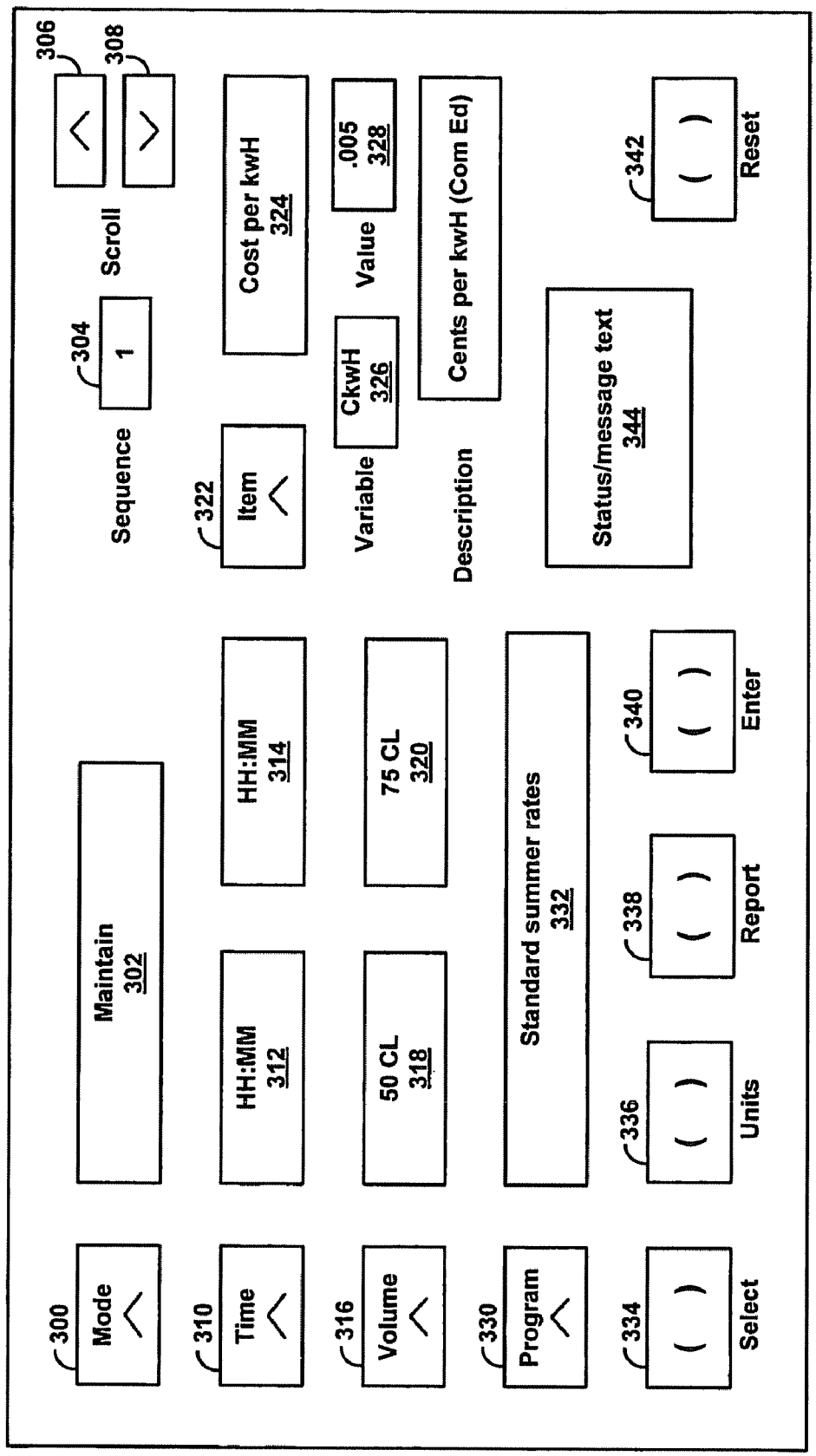
FIG. 3 is a block diagram of one preferred embodiment of a microprocessor control unit for energy optimization.

Referring now to FIG. 3, one possible physical manifestation of a user interface with the optimization scheme is described. This user interface can function, for example, as a control unit that controls an energy consuming installation, such as the energy consuming installation of FIG. 1. The most apparent part of the user interface is that it looks somewhat like a digital thermostat, although the user interface might alternatively take a variety of other physical appearances that might not necessarily resemble a digital thermostat.

This user interface may function as the control unit for the optimization scheme and serve three general purposes. First, the user interface can allow the user to select the objective or other criteria used in regulating electricity and/or hydrogen production. Second, the user interface can allow the user to define or select values for constants, variables and statistical profiles that are used in the various energy optimization formulas. Third, the user interface can provide the user with displays of the system's performance and progress towards achieving the optimization objectives. These are merely examples, and the user interface might serve other functions.

The user interface might conveniently be located at any location throughout an energy consuming installation, thereby enabling users of the energy consuming installation to readily access the user interface and control the energy consuming installation. Alternatively, the user interface might be located remotely from the energy consuming installation. While the energy consuming installation might only include one user interface, it might alternatively include more than one user interface, thereby allowing a user multiple different points at which the user can access a user interface in order to control the energy consuming installation.

The user interface might take other forms than that depicted in FIG. 3. For example, rather than being a hardware component, as is depicted in FIG. 3, the user interface might alternatively be a software component running on a computer or other device. The computer might display on a screen an interface that resembles the user interface depicted in FIG. 3. A user could then interact with the computer, for example through a touch screen or other input method, in order to control the energy consuming installation. This particular interface might be in place of the physical interface described in FIG. 3, or the energy consuming installation may include both user interfaces. That is, the energy consuming installation might be controlled by one or more physical user interfaces as are depicted in FIG. 3, and it might also be controlled by software interfaces on a computer or other such device.

Returning to the particular user interface embodiment of FIG. 3, the user interface preferably includes a processor (e.g., a microprocessor) for controlling one or more aspects of the energy optimization scheme; however, the processor (or other control circuitry) might alternatively be located separately from the user interface. That is, the user interface might not include the processor but rather interface with a remotely located processor used to control the energy consuming installation, or the user interface itself might include the processor.

The user interface preferably has inputs from the major components of the optimization scheme, particularly those that are dynamic in terms of energy production or consumption. The user interface can also receive data inputs from sources external to the intelligent generation system. Some examples of these external sources include real-time market rate information from the electric utility and projections of solar energy and wind from weather service bureaus. These inputs might be wired directly from their respective sources to the user interface; however, they might alternatively be wired to a central source that in turn interfaces with the user interface, or connect to the user interface using wireless methods. The central source might provide a convenient mechanism for providing this data to multiple user interfaces or to a user interface and to other circuitry.

One possible manifestation of the control unit includes an LCD display, five user input buttons, and up and down buttons to allow the use to select values. The first button 300, "Mode," provides options for the user to select one of multiple hydrogen production scenarios using the up or down buttons. The Mode display 302 provides a brief description of the various options. More than one scenario can be selected. The user interface includes a Sequence display 304 and corresponding up and down scroll buttons 306, 308 for moving between sequences. A user may then select more than one scenario on the basis of sequences (e.g., scenario #3 followed by scenario #5) by, for example, simultaneously holding down the "Mode" button and the up arrow 306.

The second user input button 310, "Time," allows the user to select one or more times or time periods associated with the electricity and/or hydrogen production scenario selected. For example, if the user selects production scenario #3, which creates the objective to produce a defined minimum volume of hydrogen between the hours of t1 and t2, then the user may use the up and down arrows 306, 308 to select the hours for t1 and t2. The specified times may be displayed on first and second Time displays 312, 314.

The third user selection button 316, "Volume," allows the user to select either the minimum volume of hydrogen or a range of hydrogen volumes using the up and down buttons. The pressure at which the hydrogen is to be stored can either be a default value or selected (subject to a maximum) by the up and down buttons 304, 306. The selected volumes may be displayed on first and second Volume displays 318, 320.

The fourth user selection value 322, "Item", allows the user to scroll through a list of constants or variables using the up and down arrow keys 306, 308, and then allows the user to select a value or a range of values for the constant or variable. For example, the user can scroll to the constant for "electric rate" and then input the value for cost per kilowatt hour; in this case (and assuming that this information is not directly accessed from the electric utility via the web or wireless interface), the user inputs one or more values (depending on whether time-of-use, flat rate, or market rate information applies). The selected constants and variables may be displayed in first, second and third Item displays 324, 326, 328.

The fifth user input button 330, "Program," allows the user to select one or more profiles for the operation of the system, including direct input of rate or weather values and statistical profiles (e.g., learning mode, daily profile, weekly profile, monthly profile, average profile). Cost data for grid electricity and natural gas can be incorporated into the system through a variety of methods: wireless/cellular connection to a utility database, wired or wireless Internet, or manual input. The selected program may be displayed in a first Program display 332.

The user interface may include additional input buttons and displays. For example, the user interface depicted in FIG. 3 additionally includes a "Select" button 334, a "Units" button 336, a "Report" button 338 and an "Enter" button 340. The user interface may also include a "Reset" button 342, which can be used to reset the user interface. As depicted in FIG. 3, the user interface also includes a status display 344, which can be used to display status or other information. The buttons and displays illustrated in this figure may be arranged in other alternate arrangements, and the user interface may include additional buttons or displays. For example, in alternate embodiments, some of the separate displays depicted in this figure might be combined into a single display. Other variations are also possible.

Figure 4:
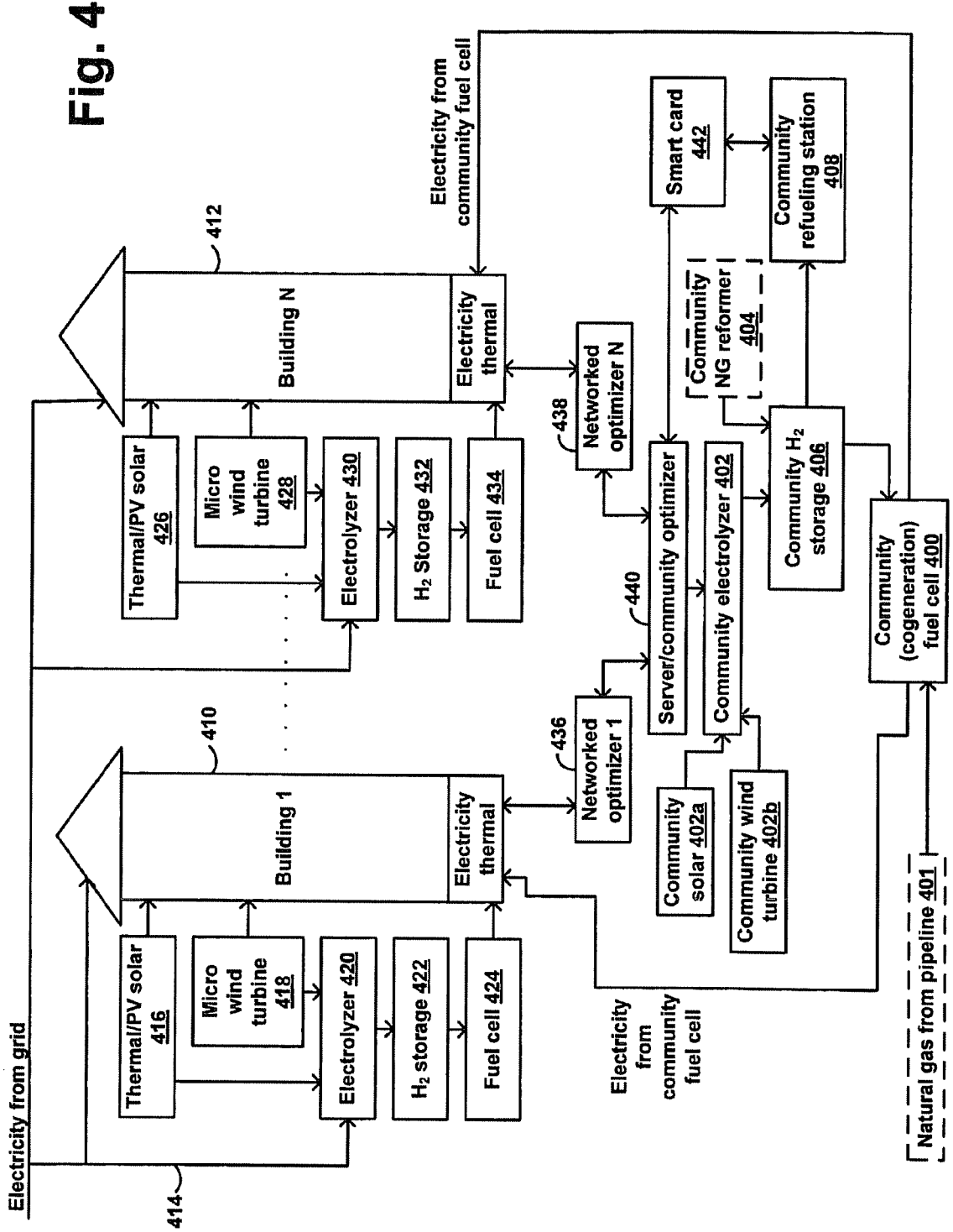
FIG. 4 is a block diagram of a networked version of an energy optimization method.

FIG. 4 describes one possible embodiment of the optimization scheme in an environment that networks multiple buildings. In this embodiment, the hydrogen infrastructure for a community includes a community fuel cell 400, a community electrolyzer 402, a community natural gas reformer 404, a community hydrogen storage tank 406, and a community refueling apparatus 408, which are all depicted as centralized components. If a solid oxide fuel cell is used for the community, then the centralized hydrogen-producing apparti might not require a natural gas reformer because solid oxide fuel cells can process natural gas directly into hydrogen. The hydrogen infrastructure might also include a community solar panel 402a, a community wind turbine 402b or other energy sources that interface with the community electrolyzer 402. Additionally, the community fuel cell 400 (if it is a solid oxide or other type of fuel cell that can process natural gas directly) might receive natural gas from a pipeline 401 or other source as well as interfacing with the community hydrogen storage 406.

Additionally, such an installation might not require the allocation of steam or hot water resulting from the processing of hydrogen into electricity, as such steam or hot water can be co-generated to produce additional electricity. Individual buildings in such a community may be equipped with smaller fuel cells and renewable sources of electricity and thermal energy, such as solar panels (providing either thermal or photovoltaic energy, or both), microwind generators or other sources, but the individual buildings generally would not have individual refueling apparati. Alternatively, these smaller elements may serve a combination of two or more buildings although FIG. 4 depicts each building having its own respective elements.

For example, FIG. 4 includes N different buildings in the community although only buildings 1 and N are actually depicted in the figure. An electricity grid provides electricity to all buildings via a connection 414; however, it is possible that the connection 414 alternatively provides electricity to some but not all buildings in the community. Still alternatively, different electricity grids and/or connections from the same electricity grid may provide power to the various buildings. As is illustrated, the connection 414 may additionally provide power to other components associated with one or more of the buildings. The buildings may additionally receive electricity via a connection with the community fuel cell 400.

Building 1 includes a thermal/photovoltaic source 416, a microwind turbine 418, an electrolyzer 420, hydrogen storage 422 and a fuel cell 424. Similarly, Building N includes a thermal/photovoltaic source 426, a microwind turbine 428, an electrolyzer 430, hydrogen storage 432 and a fuel cell 434. It should be understood that while this figure depicts buildings 1 and N as having the same components, the two buildings may alternatively have different components than each other. Also, the buildings may have additional components to those depicted in the figure, or they might not have all the components depicted in the figure. Other variations are also possible.

In this embodiment, the optimization scheme remains the same except that now it is multivariate. For example, each building may have an optimization microprocessor 436, 438, which may be physically located within the building or outside of the buildings. Alternatively, one of these microprocessors 436, 438 may serve more than one building. Each building may in turn be networked to a central server 440, and the central server 440 may in turn optimize the energy needs and costs of the entire community. That is, rather than optimizing the energy needs of each individual residence or other building, the combined needs of all the network residences might be jointly optimized.

In such a multivariate embodiment, the independent objective function for building 1 is stated as $Y_1=a1X1+a2X2+a3X3$. The independent objective function for building n is stated as $Y_n=a1X1+a2X2+a3X3$. X1, X2 and X3 and the constants a1, a2 and a3 have the same definitions and are subject to the same constraints as the same variables and constants in a single building configuration. Likewise, the dependent objective function for each building in the networked community takes the form $Z_n=b1Y1+b2Y2+b3Y3+Y_n$. Y1, Y2 and Y3 and the constants b1, b2 and b3 have the same definitions and are subject to the same constraints as the same variables and constants in a single building configuration. The goal of minimizing the energy cost for the networked community, subject to the individual hydrogen requirements of each building and each building's goal of minimizing the total cost of energy, takes the form $Z=b1Y1+b2Y2+b3Y3+Z_1+Z_2+\ldots+Zn$. In this scenario, the constants b1, b2 and b3 and variables Y1, Y2 and Y3 refer to community requirements and resources. For example, Y2 in the community's dependent objective function refers to the available supply of both electricity and thermal energy from communal (rather than individual) renewable sources and apparati. The multivariate optimization method can also be applied to simpler embodiments of individual optimization, such as the electricity-only system described above, or to a combination of various types of individual embodiments, e.g., individual systems that incorporate both batteries and hydrogen, and electricity-only systems that use batteries only.

In one preferred embodiment of the optimization scheme in an environment that networks multiple buildings, the centralized server 440 may maintain the energy balance of each homeowner in the form of debits and credits. Credits may be provided through a combination of a monthly allotment of the hydrogen produced to the homeowner (e.g., calculated in a way similar to how monthly assessments in a condominium community may be determined) and any surplus of electricity provided by the homeowner to the centralized electrolyzer by renewable energy sources.

A "smart card" 442 or other similar device might be used as the basis for measuring the amount of hydrogen a homeowner withdraws from the centralized storage device 406, such as for peak electricity demands or for providing transportation fuel to that homeowner's vehicle. Then, the withdrawal may be debited to the homeowner's account. This may then provide one method of satisfying the three objectives of community-based hydrogen refueling, minimizing the energy costs of individual homeowners, and ensuring that an adequate supply of hydrogen is available from refueling. In one additional embodiment of this community-based optimization scheme, homeowners can "reserve" a specific allotment of hydrogen, which in cumulative turn provides the value for the objective $Y_n$.

A series of microprocessor-based units among several buildings can be networked to provide the minimum total cost and required hydrogen production for a community. In such a networked environment, the ability to track an individual user's net contributions to and net withdrawals from the "hydrogen account" would result in a calculated allocation that could, for example, be assessed or credited with the monthly assessment. In a similar manner, in the electricity only example embodiment of FIG. 7, each user's acquisition, consumption and storage data from each individual system can be aggregated for a community optimizer 711 This data, combined with current and projected market costs for electricity from the utility and current and projected output of community renewable electricity generation resources, such as a Community solar array 716 or a Community wind turbine 714, is analyzed by the community optimizer 711 to calculate the lowest acquisition cost profile for each user, based on each user's individual acquisition, consumption and storage profile.

Figure 7:
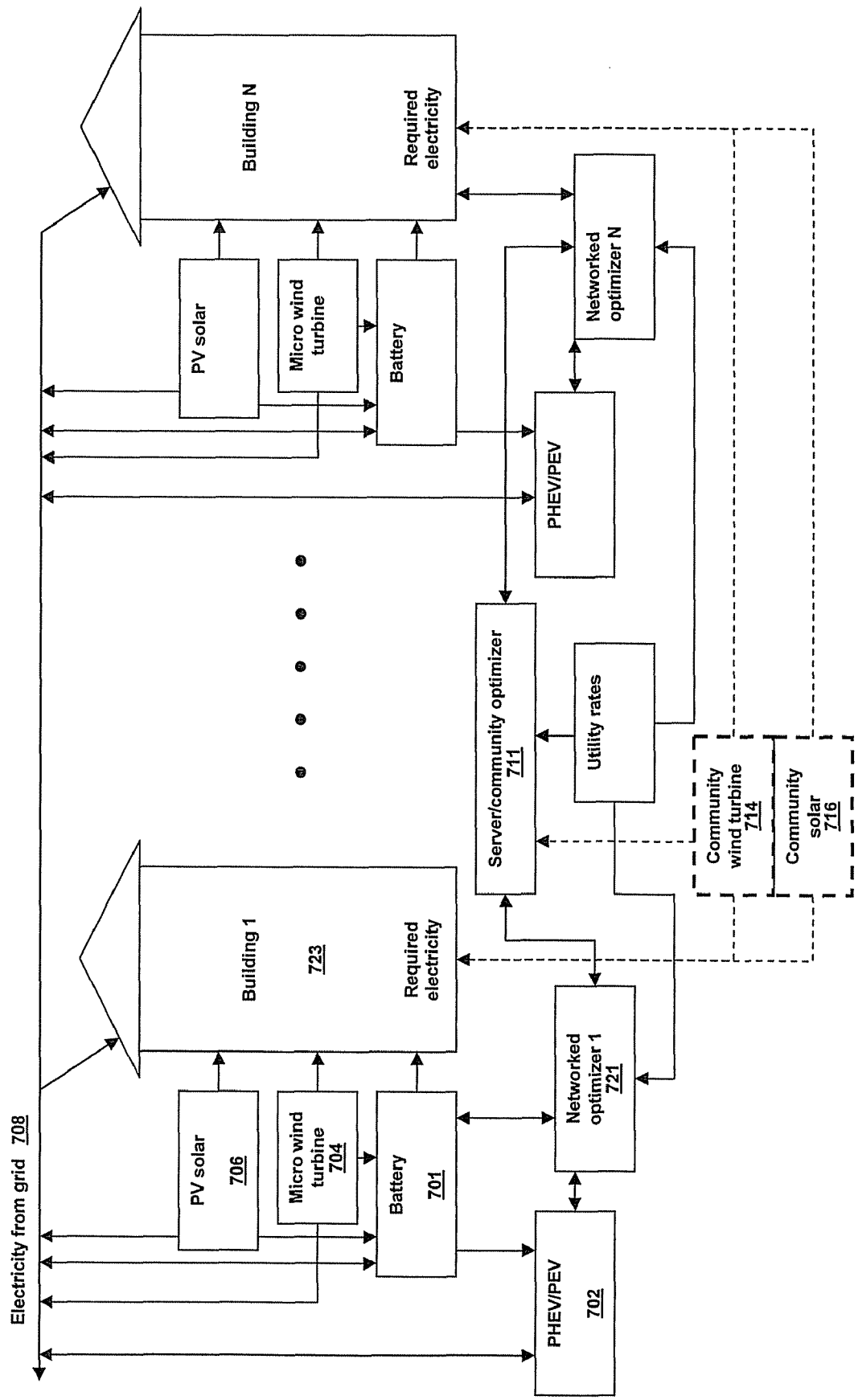
FIG. 7 is a block diagram of a networked version of an example electricity-only optimization method.

The example multivariate networked optimization system depicted in FIG. 7 corresponds to the example embodiment depicted in FIG. 4 with some minor differences. One is that FIG. 7 depicts an electricity storage component 701 (e.g., a battery) rather than a $H_2$ storage component 422, as shown in FIG. 4. In the example embodiment of FIG. 7, electricity for storage can be acquired from one or more PV solar panels 706, a one or more wind turbines 704, or the electric grid 708, for example. Another difference is that FIG. 7 depicts on-site refueling of a PHEV/PEV 702 using electricity at a building rather than a community refueling station. A Networked optimizer 721 optimizes the energy requirements of a particular Building 723 in the networked system, as well as communicates energy data to the server/community optimizer 711.

The relationship between the networked optimizer 721 at each building and the server/community optimizer 711 that aggregates data from each building's optimizer provides the lowest acquisition cost profile for each user. Moreover, for systems in utility service areas that allow users to sell electricity back to the utility, the multivariate optimization method provides the highest cost resale profile for each user, from which electricity generated by renewable apparati like the wind turbine 704 or the one or more PV solar panels 706 can be sold back to the electric grid 708. Similarly, the multivariate optimization method provides the highest cost resale profile for each user from which electricity stored in the on-site electricity storage component 701 (e.g., on-site batteries) or in the electricity storage component or batteries contained within the PHEV/PEV 702 can likewise be sold back to the electric grid 708.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for optimizing the use of utility-supplied energy sources and renewable energy sources, the method comprising:

optimizing a stored volume of stored energy, wherein the stored volume of stored energy is created from utility-provided energy sources or renewable energy sources, and wherein the stored volume of stored energy is optimized using a first formula that includes parameters accounting for energy requirements of a building, energy requirements of at least one vehicle powered in part or in whole by the type of energy stored, and user-configurable optimization criteria; and optimizing respective amounts of power obtained from the utility-provided energy sources, produced by the renewable energy sources, and produced by converting energy in the stored volume of stored energy to power, wherein the respective amounts of power are optimized according to a second formula that is dependent on the first formula.

2. A computer readable medium having stored therein instructions for causing a processor to execute the method of claim 1.

3. The method of claim 1, wherein optimizing the stored volume of stored energy comprises producing a specified volume of stored energy as rapidly as possible while minimizing a total cost for producing the specified volume of stored energy.

4. The method of claim 1, wherein optimizing the stored volume of stored energy comprises producing a specified volume of stored energy within a predefined amount of time while minimizing a total cost for producing the specified volume of stored energy.

5. The method of claim 1, wherein the first formula is $Y=a1X1+a2X2+a3X3$, wherein X1 is the capability that natural gas can provide to the production of stored energy, X2 is the direct renewables to stored energy capability that the renewable energy sources can provide to the production of stored energy, X3 is the capability that a utility-provided power grid can provide to the production of stored energy, and wherein a1, a2 and a3 are constants.

6. The method of claim 5, wherein the second formula is $Z=b1Y1+b2Y2+b3Y3+Y$, wherein Y1 is a requirement of thermal energy from natural gas, wherein Y2 is an available supply of electricity and thermal energy from renewable sources, Y3 is a requirement of electricity from the utility-provided power grid, and wherein b1, b2 and b3 are constants.

7. The method of claim 6, wherein Z further includes variables accounting for historical and projected profiles of various forms of energy supply, and wherein Y includes variables allowing for a range of stored energy volumes and a timeframe for producing the stored energy volumes.

8. The method of claim 1, wherein optimizing the stored volume of stored energy comprises optimizing the stored volume of stored energy based on combined energy requirements for at least two buildings and at least one vehicle powered in whole or in part by the type of energy stored.

9. A method for an energy management system to optimize energy costs associated with providing energy from different sources for use within a building, the method comprising:
   determining an energy requirement for a building and a stored energy fuel requirement for at least one vehicle powered in whole or in part by the type of energy stored;
   determining at least one user-defined scenario governing production of stored energy from utility-supplied energy sources and renewable energy sources;
   optimizing an amount of stored energy according to the energy requirement for the building, the stored energy fuel requirement for the vehicle powered in whole or in part by the type of energy stored, and the user-defined scenario; and
   optimizing respective amounts of energy consumed from the utility-supplied energy sources and the renewable energy sources according to the energy requirement for the building, the fuel requirement for the vehicle powered in whole or in part by the type of energy stored, and the user-defined scenario; and
   wherein optimizing an amount of stored energy comprises optimizing the amount of stored energy according to an independent formula that includes as parameters: a direct renewables to stored energy capability that renewable energy sources provide to producing stored energy and a capability that a utility-supplied electric grid provides to producing stored energy; and
   wherein optimizing an amount of stored energy comprises optimizing the amount of stored energy according to a dependent formula that includes as parameters: a requirement of thermal energy from natural gas, an available supply of electricity and thermal energy from renewable sources, a requirement of electricity from the utility-supplied electric grid, and the independent formula.

10. A computer readable medium having stored therein instructions for causing a processor to execute the method of claim 9.

11. The method of claim 9, wherein the user-defined scenario specifies an amount of stored energy to be produced as rapidly as possible while minimizing a total energy cost.

12. The method of claim 9, wherein the user-defined scenario specifies an amount of stored energy to be produced within a given time period while minimizing a total energy cost.

13. The method of claim 9, wherein the user-defined scenario specifies that energy be provided to the building at a minimum cost regardless of which sources are used.

14. A method for optimizing energy costs for a networked group of buildings, the method comprising:
   for the networked group of buildings, optimizing the utilization of energy obtained from utility-supplied energy sources, renewable energy sources, and stored energy according to a optimization function, and
   wherein the networked group of buildings includes N buildings, and wherein the optimization function is of the form $Z=b1Y1+b2Y2+b3Y3+Z1+Z2+ \ldots +Zn$, wherein Y1, Y2 and Y3 are variables defining energy requirements and resources for the group of networked buildings, wherein b1, b2 and b3 are constants, and wherein Z1 . . . Zn are respective energy optimization functions for each building in the networked group of buildings.

15. The method of claim 14, further comprising optimizing an amount of stored energy for use by buildings in the networked group of buildings, wherein the stored energy is generated from the utility-supplied energy sources and the renewable energy sources, and wherein the amount of stored energy is optimized according to the optimization function.

16. The method of claim 14, wherein the optimization function includes variables defining energy requirements and resources for the networked group of buildings and also includes variables defining energy optimization criteria for each building in the networked group of buildings.

17. The method of claim 14, wherein Z1 . . . Zn are respective dependent optimization functions for each building in the networked group of buildings, and wherein each dependent optimization function optimizes amounts of power for the respective building to be obtained from utility-provided energy sources, renewable energy sources, and converting stored energy into energy.

18. The method of claim 17, wherein each dependent optimization function for a building in the networked group of buildings is dependent on a respective independent optimization function, and wherein each independent optimization function optimizes a stored volume of stored energy created from energy obtained from the utility-provided energy sources or the renewable energy sources.

19. A computer readable medium having stored therein instructions for causing a processor to execute the method of claim 14.

* * * * *